United States Patent

Kim

[11] Patent Number: 5,680,668
[45] Date of Patent: Oct. 28, 1997

[54] CONTOUR MATCHING ICE SCRAPER

[76] Inventor: Dae Sik Kim, 49 Floral St., Newton, Mass. 02161

[21] Appl. No.: 569,495

[22] Filed: Dec. 8, 1995

[51] Int. Cl.⁶ .................................. B60S 1/04; A47L 1/06
[52] U.S. Cl. .......................... 15/236.02; 15/236.07; D32/49; D32/46; 30/136; 30/169
[58] Field of Search ................... 15/236.01, 236.02, 15/236.07, 236.08, 236.03, 236.04, 236.05, 236.06, 111; D32/40, 49, 42, 46, 48; 30/136, 136.5, 164.8, 169, 171, 172

[56] References Cited

U.S. PATENT DOCUMENTS

| 2,212,197 | 8/1940 | Roesch et al. | 15/236.07 |
| 2,264,374 | 12/1941 | Henschell | 15/236.07 |
| 2,935,758 | 5/1960 | Muscott | 15/236.07 |
| 2,944,275 | 7/1960 | Markusen | 15/236.01 |
| 2,957,192 | 10/1960 | Faughnder | 15/236.07 |
| 4,418,439 | 12/1983 | Porchet | 15/236.02 |
| 5,095,573 | 3/1992 | Henke et al. | 15/236.01 |
| 5,392,484 | 2/1995 | Stoltzfus | 15/245.1 |

FOREIGN PATENT DOCUMENTS

| 554421 | 3/1958 | Canada | 15/236.07 |
| 868962 | 3/1953 | Germany | 15/236.07 |
| 86887 | 2/1956 | Norway | 15/236.07 |

*Primary Examiner*—Gary K. Graham

[57] ABSTRACT

A T-shaped scraper for curved windshield and windows of a newer aerodynamically designed automobile comprises an elongated handle at the stem and a blade with an arc-shaped scraping edge which provides various scraping curvatures by varying the angle of attack. For more intimate contact between a wider portion of the scraping edge and the glass surface, a combination of the scraping induced normal force on the edge, elastic deformations of the edge and the custom profiled blade are used.

1 Claim, 1 Drawing Sheet

CONTOUR MATCHING ICE SCRAPER

BACKGROUND OF THE INVENTION

1. Field of the Invention

This invention relates to a device for removing frost, ice or coatings from a surface with various curvatures and more specifically an ice scraper for windshield and windows of a newer aerodynamically designed automobile.

2. Descriptions of the Prior Art

Prior art ice scrapers are designed primarily for a flat surface. Unlike old cars, recent, energy efficient, aerodynamically improved automobiles have more convex exterior glass surfaces. For these surfaces, a flat scraper contacts and cleans only a narrow strip of the surface in each stroke and are almost useless.

In several prior arts, such as in U.S. Pat. Nos. 4,970,749; 4,422,206; or 4,418,439, scrapers with a flexible scraping edge with various handle designs were proposed. In these scrapers, the primary means of changing the curvature of the scraping edge to match the contour of the glass surface is to flexibly bend the edge by forcing it toward the glass. The pushing force required to bend the flexible edge is generally large and sometimes requires both hands. This added effort to the scraping and the limited selection of the flexible but hard material which can withstand the scratching ice makes these scrapers impractical.

As an alternative to mechanical scraping, one can use various deicing chemicals or use heat to melt off the ice by idling an engine longer. These toxic water soluble deicers are expensive and not reusable. Furthermore, they pollute the water and the air with VOC such as methanol or glycol. On the other hand, idling an engine to warm up and waiting for the ice to melt tends to waste fuel, increase engine wear due to high idle speed Which is common to all newer cars with catalyst and increase the warm-up emissions of CO and HC.

Obvious other ways of avoiding these problems is to keep the car in a garage or to cover it. But outdoor parking and icing of the windshield are is still unavoidable when traveling. More cars are parked on the street overnight in the congested and populated cities of Northeastern parts of the U.S. where many of the houses were built before cars became popular and thus have no garages. Similarly, in many emerging countries, street parking is wide spread where the air quality is already bad. Thus, an efficient ice scraper which can clean windows in a minute is desirable for saving time and fuel and improving the air quality and safety.

SUMMARY OF THE INVENTION

This invention provides an efficient means for removing frost, ice or other coatings from a surface with various curvatures. More specifically, this invention provides more efficient ice scraper for automotive windshield and windows.

Newer automotive glass surfaces range from a nearly flat to a convex surface with radius of curvature of about one meter. A surface with shorter radius of curvature would be difficult to make uniform and distort driver's view. Generally these curvatures deviate slightly from a pure spherical arc and change with the direction of the scraping. Our comparative performance tests of various commercially available scrapers and makeshift flexible scrapers showed that, for an efficient removal of ice, the scraping edge must be sharp and make an intimate contact with the glass surface as a very thin layer of ice remaining on the glass can effectively block the driver's view. Also many rigid plastics, such as HIPS, and metals are found to be hard enough to withstand the ice chips and scraping but soft enough to avoid scratching the glass.

In this invention, a T-shaped scraper has a handle at the stem and a blade at the top with an arc-shaped beveled scraping edge which is protruding out and bowed at the middle. Unlike any prior art scraper, this edge changes its scraping curvature to contact intimately with a wider portion of the contour for any curvature of windshield and windows by simply changing its angle of attack, the relative angle between the handle and the direction of scraping on the glass surface.

When the scraper of this invention is placed on a flat surface, the both ends of the scraping edge and the lower end of the handle touch the flat surface (see FIG. 2). The middle and the rest of the scraping edge will form a curved line. As the handle is lifted gradually, the angle of attack increases and the radius of the scraping curvature becomes longer. Finally, the whole edge touches the flat surface which represents infinitely long radius of curvature and the great circle (or plane) of the scraping arc coincides with the flat surface (see FIG. 3). At even larger angle, the edge mates with a convex surface with negative radius of curvature.

To provide a more intimate and wider contact between the scraping edge and the glass surface, this invention uses a combination of the scraping induced normal force and the elastic deformations of the beveled edge and of the blade, which is a matched pair of cantilevers whose bending and twisting characteristics can be easily modified by changing their thickness and/or width toward the ends. As an additional means of forcing the blade and scraping edge to the glass surface at the both ends, one can modify the arc of the edge from a circle to other shapes, such as of an ellipse with the major axis parallel to the blade. The final optimum shapes of the arc and the blade profile for a given blade material can be determined by finite element analysis (FEA) of the blade and actual field tests accordingly to a well established engineering practice.

BRIEF DESCRIPTION OF THE DRAWINGS

The present invention will be better understood by reading the following description and the accompanying drawings wherein.

BEST MODE FOR CARRYING OUT THE INVENTION

Figure 1:
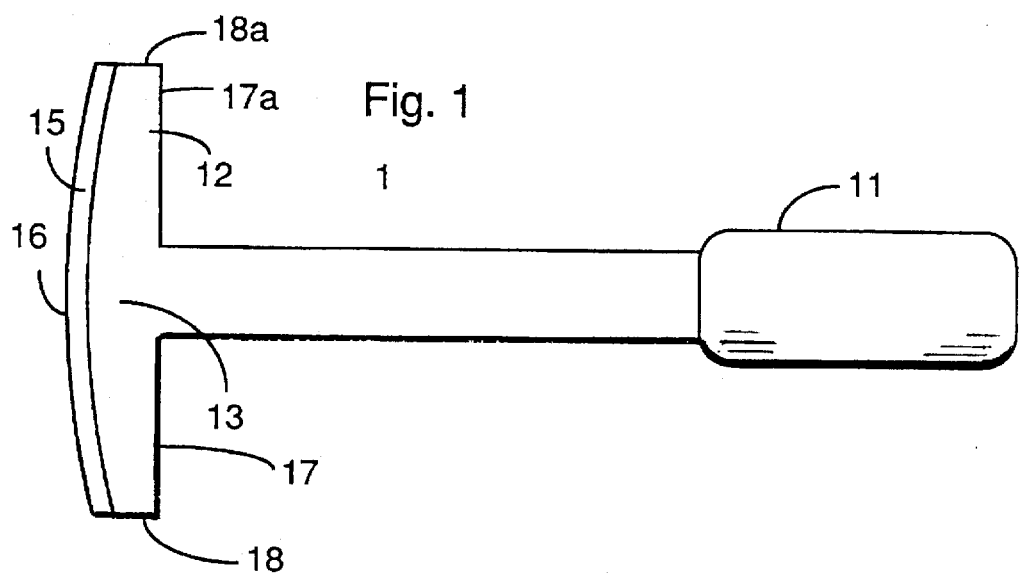
FIG. 1 is a top view of an ice scraper.
Figure 3:
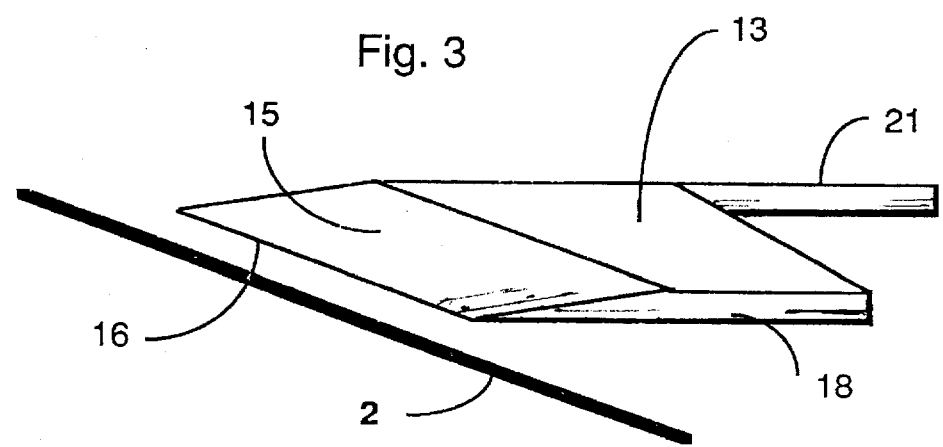
FIG. 3 is an enlarged partial front view of the scraper blade with a shortened handle and with a line 2 indicating the great circle/plane of the scraping edge.

In FIG. 1, an injection molded T-shaped plastic scraper 1 has a 20 to 30 cm long handle 11 with a flat stem portion at one end and a rounded grip portion at the other end, and a 10 to 15 cm long and about 2 cm wide curved scraping blade 12. In FIG. 3, the handle 11 is shortened to be used as a handle mount 21 which could be inserted into a stronger pinched metal tube handle (not shown).

Figure 2:
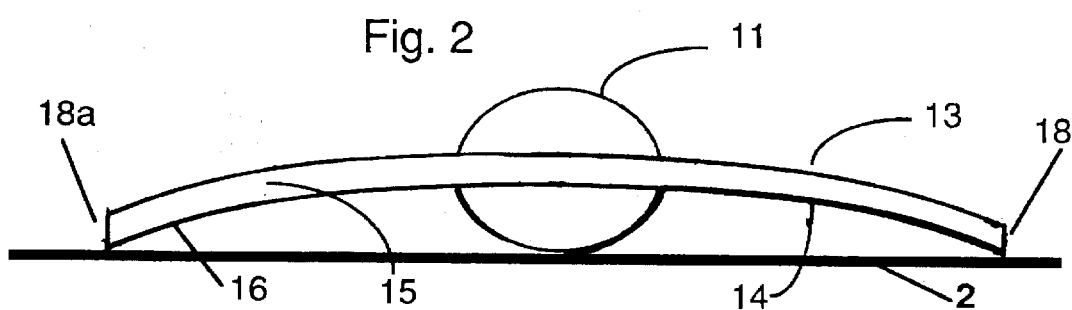
FIG. 2 is an enlarged left side view of the ice scraper of FIG. 1.

Referring to FIG. 2 and FIG. 3 for detail, the blade 12 has a upper curved face 13, a nearly parallel curved bottom face 14 and a curved beveled face 15 along the outer part of the upper face 13. The beveled face 15 and the bottom face 14 join and form a sharp scraping edge 16 with about 15° of angle. The blade 12 also have two back paces 17 and 17a and ends 18 and 18a. The thickness of the blade 12 is about 5 mm or less and depends on the strength of the material selected.

When the operating angle of attack is kept between 15° for the shortest radius of curvature of about 1 m and 30° for a flat surface, the radii of arcs become about 30 cm for the scraping edge in the direction of the handle and about 60 cm for the blade. With a little practice, one can find the best angle and direction of attack to remove the widest strip of ice with the middle part of the edge.

Uses of a uniform thickness, straight back paces for 17 and 17a and pure (circular) arc for both curvatures of the blade 12 and the scraping edge 16 simplify the mold design and give an initial product with an acceptable performance. However, these structural variables can be optimized for a better scraper.

It is understood that the above description is given merely by way of illustration and not in limitation of the invention and that various modifications may be made thereto without departing from the spirit of the invention as claimed.

I claim:

1. An elongated, T-shaped windshield scraper, said scraper comprises:

an elongated, plastic handle defining an axis of elongation of said scraper, said handle having first and second ends with a rounded grip portion at said first end and an elongated, flat stem portion at said second end;

an elongated, plastic blade fixed at an intermediate portion thereof to said stem portion and of one piece therewith, said blade extends in a first plane perpendicular to said axis to define first and second ends, said ends of said blade extend substantially parallel with said axis, said first plane passes through said ends of said blade, said blade is curved, in an unbiased state, along said length in said first plane to define upper and lower curved faces, said blade having a radius of curvature in said first plane of approximately 60 cm, said blade has a leading scraping edge that is curved in a second plane that is perpendicular to said first plane such that said scraping edge is compoundedly curved, said scraping edge having a radius of curvature in said second plane of approximately 30 cm, said scraping edge protrudes in an opposite direction with respect to said handle and is defined by a curved beveled face joining said upper and lower faces, said beveled face is at approximately 15 degrees with respect to said lower face, said blade has a pair of elongated back faces which extend within said first plane to said ends of said blade.

* * * * *